July 9, 1946.  A. G. BADE  2,403,627
VARIABLE SPEED TRANSMISSION
Filed April 24, 1944
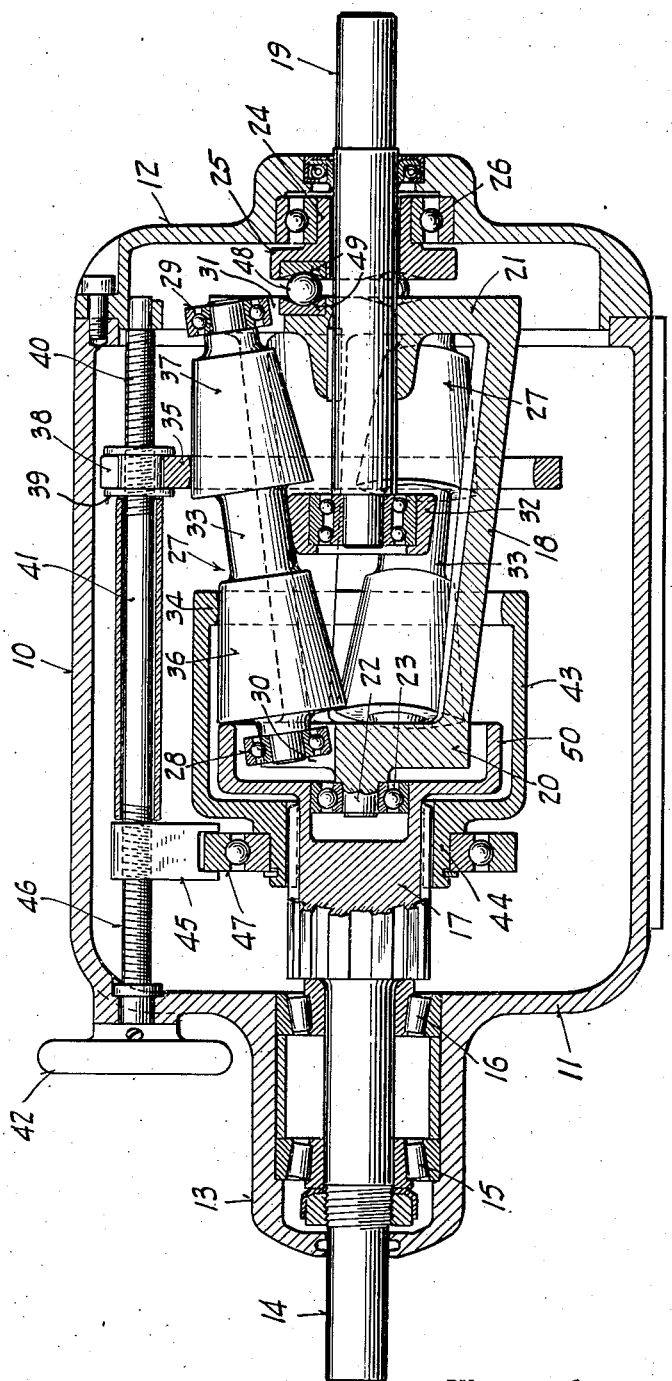
Alfred G. Bade
INVENTOR.
BY
ATTORNEY.

UNITED STATES PATENT OFFICE 2,403,627

VARIABLE-SPEED TRANSMISSION

Alfred G. Bade, Wauwatosa, Wis., assignor to The Falk Corporation, Milwaukee, Wis., a corporation of Wisconsin Application April 24, 1944, Serial No. 532,394

6 Claims. (Cl. 74—281)

This invention relates to variable speed transmissions of the kind involving a set of inclined planet rollers whose planetary action may be varied to regulate the speed ratio of the transmission.

The variable speed transmission shown in my prior Patent No. 2,328,536 is typical of the kind mentioned. In it the inclination of the several rollers is fixed by three axially spaced concentric rings which engage the rollers at longitudinally spaced points thereon, one of the rings being non-rotatable and movable along tapered sections of the rollers to vary the planetary action thereof and thus regulate the speed ratio of the transmission.

One object of the present invention is to increase the speed range of variable speed transmissions of the kind mentioned.

Another object is to provide speed responsive means for developing the required contact pressures between the rollers and rings in variable speed transmissions of the kind mentioned.

Other more specific objects and advantages will appear from the following description of an illustrative embodiment of the present invention.

The single figure of the accompanying drawing is a longitudinal sectional view of a variable speed transmission constructed in accordance with this invention.

The variable speed transmission selected for illustration is shown enclosed within an appropriate housing 10 permanently closed at one end 11 and having a removable end head 12 providing a closure for the other end.

An integral hollow boss 13 projecting from the housing end 11 provides support for a driven shaft 14 journalled in appropriate bearings 15 and 16 therein. The inner end of the shaft 14 is enlarged to form a splined cylindrical head 17 for a purpose which will hereinafter appear.

A rotary cage 18 is supported at one end by the driven shaft 14 and at the other end by a drive shaft 19. In this instance the cage 18 includes integrally connected end disks 20 and 21, the former having an integral trunnion 22 journalled in a bearing 23 seated in a recess formed in the inner end of the cylindrical head 17 of the driven shaft 14. The drive shaft 19 is rigidly fixed to the other end disk 21 and extends axially therethrough and through the supporting sleeve 24 of a disk 25, the sleeve 24 being journalled in a bearing 26 seated in the housing end head 12. The shaft 19 is free to slide lengthwise in the supporting sleeve 24.

The driving and driven shafts 19 and 14 are aligned and the cage 18, supported thereby, is rotatable about an axis coincident with the axes thereof.

A set of inclined planet rollers 27, preferably three in number, are rotatable with and driven by the cage 18. Each roller is also rotatable in an opposite direction about its own axis, the axes of the rollers being equally inclined relative to the axis of rotation of the cage and in such directions as to intersect the cage axis at a common point. Bearings 28 and 29 at opposite ends of each roller are closely fitted in radial slots 30 and 31, respectively, provided in the end disks 20 and 21, by which the rollers are positioned to maintain the axis of each in a fixed radial plane of the cage 18 and through which the rollers are driven.

A ring 32 mounted for free rotation on the inner end of the drive shaft 19 is in rolling contact with an intermediate and preferably reduced portion 33 of each of the several rollers to provide a fulcrum support therefor. The rollers are encircled by two torque sustaining rings 34 and 35 in rolling contact with longitudinally spaced tapered sections 36 and 37, respectively, of each roller. These rings 34 and 35 coact with the rollers and with the ring 32 to radially position the rollers and to preserve the inclination thereof. The degree and direction of taper of both roller sections 36 and 37 are such that their outer extremities are parallel to the axis of rotation of the cage so that the rings 34 and 35 may be shifted lengthwise thereof while maintained in contact therewith.

Ring 35 is non-rotary. It functions to regulate and govern the rate of rotation of the rollers about their individual axes and for that purpose it may be shifted lengthwise of the tapered roller sections 37. In this instance the ring 35 is shown equipped with a radially slotted projection 38 positioned to embrace the reduced portion of a flanged nut 39 mounted on the threaded portion 40 of a control rod 41. The rod 41 is shown suitably journalled at opposite ends in the upper part of the casing 10 and equipped with appropriate means, such as a hand wheel 42, by which it may be rotated.

It will thus be noted that the ring 35 is supported by the several roller sections 37 and is thus free to accurately center itself with respect to the common axis of rotation of the roller group; that it is retained against rotation by engagement with the nut 39; and that it may be shifted lengthwise of the roller sections 37 to vary the planetary action of the rollers by rotating the rod 41 and thereby shifting the nut 39.

The ring 34 is driven by the roller sections 36 at a rate dependent upon the rate of rotation of the rollers, as determined by the position of the ring 35, and also dependent upon the position of the ring 34 with respect to the roller sections 36. In this instance the ring 34 is shown carried by a bell-shaped element 43 having a supporting hub 44 in splined engagement with the head 17 of the driven shaft 14. The ring 34 is shiftable lengthwise of the roller sections 36 by axial adjustment of the element 43.

A convenient means for axially adjusting the element 43 and ring 34 is shown in the form of a nut 45 mounted on a second threaded portion 46 of the control rod 41 and connected to the hub 44 of the element 43 through a bearing ring 47 freely rotatable on the latter.

The sections 40 and 46 of the rod 41 are preferably oppositely threaded, so that upon rotation of the control rod 41 the two rings 34 and 35 will be simultaneously shifted in opposite directions along the tapered roller sections which they engage, thereby obtaining a wide range of adjustment in the speed ratio between the driving and driven shafts. In this connection it will be noted that as the ring 35 is shifted to the right from the large toward the small ends of the tapered roller sections 37, the rate of rotation of the several rollers gradually increases causing a gradual increase in the rate of rotation of the ring 34 and driven shaft 14, and that the rate of rotation of the ring 34 and shaft are further increased as the ring 34 is shifted toward the left from the small toward the large ends of the roller sections 36.

It will of course be understood that in order to sustain the torque reaction between the rings 34 and 35 and roller sections 36 and 37 adequate pressures must be maintained therebetween to prevent excessive slip during operation. Such pressures are maintained in part by the centrifugal action of the rollers against those rings resulting from the rotation of the rollers with the cage 18. In the transmission shown these pressures are increased by additional means in the form of a set of centrifugally urged balls 48 confined between tapered seats 49 provided in the opposed faces of the cage end disk 21 and disk 25. During operation these balls 48 react to force the cage 18 and shaft 19 axially toward the left and, as a consequence, the ring 32 carried by the shaft reacts on the intermediate portions 33 of the rollers to forcibly urge the rollers against the rings 34 and 35. Suitable means, such as a ring 50 carried by the shaft head 17 and bearing against the ends of the roller sections 36, determines the lengthwise positions of the rollers and sustains the axial component of the thrust induced by the ring 32.

From the foregoing it will be noted that the pressure developed between the rings 34 and 35 and the rollers are the result of centrifugal action and thus responsive to the speed of rotation of the drive shaft 19 and cage 18, so that when the transmission is at rest these pressures are so reduced as not to interfere with free shifting of the rings 34 and 35 along the rollers.

Various changes may be made in the embodiment of the invention hereinabove specifically described without departing from or sacrificing the advantages of the invention as defined in the appended claims.

I claim:

1. In a variable speed transmission, the combination of a planet roller maintained inclined with respect to the planetary axis thereof, a nonrotary ring in frictional rolling contact with one longitudinal portion of said roller, a rotating ring in frictional rolling contact with another longitudinal portion of said roller, the portions of said roller with which said rings contact being tapered in the same direction, and means for shifting said rings lengthwise of said rollers to vary the speed ratio of the transmission.

2. In a variable speed transmission, the combination of a planet roller maintained inclined with respect to the planetary axis thereof, a nonrotary ring in frictional rolling contact with one longitudinal portion of said roller, a rotating ring in frictional rolling contact with another longitudinal portion of said roller, the portions of said roller with which said rings contact being tapered in the same direction, and unitary means for shifting both of said rings simultaneously in opposite directions lengthwise of said roller to vary the speed ratio of the transmission.

3. In a variable speed transmission, the combination of a plurality of planet rollers, two torque sustaining rings encircling said rollers and contacting the latter at longitudinally spaced points thereon, and means coacting with said rollers and rings to maintain said rollers inclined with respect to the planetary axis thereof, the portions of said rollers with which said rings contact being tapered in the same direction, and said rings being movable lengthwise of said rollers to vary the speed ratio of the transmission.

4. In a variable speed transmission, the combination of a plurality of planet rollers, two torque sustaining rings encircling said rollers and contacting the latter at longitudinally spaced points thereon, means coacting with said rollers and rings to maintain said rollers inclined with respect to the planetary axis thereof, and speed responsive means acting through said last named means to develop contact pressures between said rollers and rings, said rings being movable lengthwise of said rollers to vary the speed ratio of the transmission.

5. In a variable speed transmission, the combination of a plurality of planet rollers, two torque sustaining rings contacting said rollers at longitudinally spaced points thereon, one of said rings being rotatable relative to the other, means coacting with said rollers and rings to maintain said rollers inclined with respect to the planetary axis thereof, and speed responsive means acting through said last named means to develop contact pressures between said rollers and rings.

6. In a variable speed transmission, the combination of a plurality of planet rollers, a non-rotating torque sustaining ring encircling and contacting said rollers, a rotating torque sustaining ring encircling and contacting said rollers, means contacting said rollers intermediate the points of contact of said rings with said rollers, said means coacting with said rollers and rings to maintain said rollers inclined with respect to the planetary axis thereof, and means for shifting said rotating ring lengthwise of said rollers to vary the speed ratio of the transmission.

ALFRED G. BADE.